Patented Dec. 12, 1939

2,183,145

UNITED STATES PATENT OFFICE 2,183,145

PROCESS FOR PRODUCING HYDROCARBONS

Wilhelm Michael, Ludwigshafen-on-the-Rhine, and Wolfgang Jaeckh, Heidelberg, Germany, assignors to I. G. Farbenindustrie Aktiengesellschaft, Frankfort-on-the-Main, Germany No Drawing. Application November 1, 1937, Serial No. 172,238. In Germany November 30, 1935

6 Claims. (Cl. 260—449)

The present invention is a continuation in part of the inventions claimed in our copending applications Ser. No. 112,836, filed November 25th, 1936, and Ser. No. 126,664, filed February 19th, 1937, which relate to treatments for the production of valuable hydrocarbons and their derivatives containing oxygen from carbon monoxide and hydrogen.

It has already been proposed to produce gaseous, liquid and/or solid hydrocarbons or their derivatives from carbon monoxide and hydrogen at elevated temperatures and under ordinary or slightly increased or reduced pressure in the presence of catalysts. Catalysts hitherto used for this reaction are the metals of the 8th group of the periodic system, especially iron, cobalt or nickel or their compounds, together with activating additions. In order to attain a good distribution of the catalysts the latter were preferably employed together with carrier substances, such as kieselguhr, kieselgel and the like. Before use the catalysts were subjected to a reducing treatment with hydrogen at a temperature up to about 450° C. When carrying out the said conversion of carbon monoxide with hydrogen under superatmospheric pressures, however, the use of the said catalysts proved unsatisfactory in some respects. Thus they gave rise to a marked formation of methane and, besides, became rapidly destroyed by the formation of carbonyl compounds. Furthermore, carbon black was frequently formed and caused clogging up of the apparatus.

We have now found that the conversion of carbon monoxide and hydrogen, at an elevated temperature, into liquid, solid and gaseous hydrocarbons proceeds smoothly and without trouble when working in the presence of catalysts obtained before the said conversion by thermally treating iron compounds (which expression is understood to include also materials containing the same) at such high temperatures above 600° C., preferably above 700° C., but below the melting or sublimation point of the particular compound employed or of the resulting iron, and for such a long time that at least partial sintering of the iron compound or the iron takes place. Said catalysts are also subjected to a treatment with reducing gases before their use in the said conversion of carbon monoxide and hydrogen, preferably before the completion of the said thermal treatment at temperatures above 600° C. Thus the treatment with reducing gases may be effected during the said thermal treatment; it is preferably carried so far that the iron compounds employed are completely reduced to the metal.

Suitable iron compounds are in particular those which may be reduced by hydrogen to iron at high temperatures, if necessary up to 1000° C. or above. Of these compounds mainly the oxides or those compounds which like nitrates, hydroxides, or carbonates, may be converted into oxides by merely heating them to the said high temperatures, come into consideration, but also other compounds reducible by hydrogen to iron at high temperatures, such as iron sulphide or iron oxalate or iron tartrate may be employed. The thermal treatment of the said iron compounds takes place at temperatures above 600° C., for example at 800°, 1000° C. or more, but always below the melting point of the particular iron compound or of the resulting iron. The treatment is combined with a reducing treatment either in a single operation by performing it in the presence of gases having a reducing action (hereinafter simply referred to as reducing gases), in particular hydrogen or gases containing hydrogen, or in a multiple step operation by effecting the reducing treatment subsequent to the said thermal treatment. Thus the iron compounds may first be heated to a temperature of above 600° C. in the presence of non-reducing gases, as for example nitrogen or air, and then be treated with gases having a reducing action. In this case the treatment with the gases having a reducing action may be effected at a lower temperature, as for example at 500° C. But it is preferable to effect the reducing treatment before the completion of the thermal treatment above 600° C., since the catalysts so obtained are better than those resulting from a sintering of the compounds and subsequent reduction at only 300° or 400° C.

The thermal treatment of the iron compounds in one or more stages may take place at any desired pressure, as for example at ordinary pressure as well as at elevated pressures of 2, 5, 10, or 100 atmospheres or more. The time employed for this thermal treatment depends upon the temperature and pressure used and on the nature of the particular iron compound treated; the higher are the temperatures the shorter are the requisite durations. Also the physical structure of the initial iron compound has some influence on the necessary time of treatment. As a rule durations between about one and ten hours come into consideration at a temperature of about 850° C. though the treatment may also be shorter or longer. In each particular case the time may be easily ascertained by whether a sintering has already taken place or not. Sintering is generally recognized by a shrinking, i. e. a reduction of the volume, of the catalyst by the action of high temperatures which is mostly accompanied by the catalyst becoming more compact. The reduction of the volume preferably amounts to more than 10 per cent but in the case of treating iron compounds with simultaneous reducing treatment the reduction of the volume should not be so great that the resulting mass becomes free of pores.

Of the iron compounds the precipitated hydroxides or the oxides obtained, for example, by the decomposition of the nitrates are preferably employed. The activity of the catalysts may be increased by the addition of other substances, such as the oxides or hydroxides of aluminum, silicon dioxide, kieselguhr and the like. Other additions having an activating action, as for example the compounds of copper, titanium, manganese, tungsten, molybdenum, chromium, thorium, cerium, zirconium or other rare earths may also be employed with advantage. It has been found that in many cases the presence of suitable amounts of the oxides or hydroxides of alkali metals or alkaline earth metals or their basic reacting salts may favorably influence the formation of hydrocarbons.

The conversion of carbon monoxide and hydrogen is effected at temperatures above 150° C., preferably between 200° and 450° C. Atmospheric pressure or subatmospheric pressure may be employed, but it is preferable to employ elevated pressures, such as 5, 10, 20, 50, 100 atmospheres or more.

The following example will further illustrate how the present invention may be carried out in practice, but it is to be understood that the invention is not restricted to this example.

Example

Precipitated iron hydroxide to which 5 per cent of aluminum hydroxide have been added, is heated to 850° C. in a current of hydrogen for about four hours. After cooling, a mixture of carbon monoxide and hydrogen (in the ratio of 1:2) is led over the catalyst thus obtained, at a pressure of 12 atmospheres and at a temperature of between about 280° and 360° C. In this manner not only gaseous but also liquid and solid hydrocarbons are formed in good yields, the said hydrocarbons containing a small amount of compounds containing oxygen.

If the conversion is effected with a catalyst consisting of the same constituents but which has been obtained by treatment with hydrogen at a temperature of 400° C. deposition of carbon is soon observed on the catalyst and the conversion subsides considerably even after about 2 days, whereas with the catalyst obtained by the said reducing treatment at 850° C. the conversion may be carried out for many weeks without trouble.

What we claim is:

1. A process for the conversion of carbon monoxide and hydrogen into substances selected from the group consisting of liquid, solid and gaseous hydrocarbons which comprises contacting the said carbon monoxide and hydrogen at a reacting temperature with a catalyst prepared by a thermal treatment of an iron compound at a temperature above 600° C. and in the presence of a reducing gas, but below the melting point of the iron compound or below the melting point of the iron resulting from this treatment, which by the action of a reducing gas may be converted into iron at the said temperature, the said thermal treatment being effected at such a high temperature and for such a long time that at least partial sintering of the resulting iron compound or iron takes place.

2. In the process as claimed in claim 1, contacting the carbon monoxide and hydrogen with a catalyst prepared by thermal treatment of an iron compound as defined in claim 1 at a temperature above 600° C. and in the presence of a reducing gas.

3. In the process as claimed in claim 1, contacting the carbon monoxide and hydrogen with a catalyst prepared by thermal treatment of an iron compound as defined in claim 1 at a temperature above 600° C. and in the presence of hydrogen.

4. In the process as claimed in claim 1, contacting the carbon monoxide and hydrogen with a catalyst prepared by thermally treating at a temperature above 600° C. and in the presence of a reducing gas, a compound of iron which, by the mere action of heat, is converted into an iron oxide.

5. In the process as claimed in claim 1, contacting the carbon monoxide and hydrogen with a catalyst prepared by thermal treatment of an iron compound as defined in claim 1 at a temperature above 700° C.

6. In the process as claimed in claim 1, contacting the carbon monoxide and hydrogen with a catalyst prepared by thermal treatment of an iron compound as defined in claim 1 at a temperature above 700° C. and having undergone a treatment with a reducing gas before the completion of the said thermal treatment.

WILHELM MICHAEL.
WOLFGANG JAECKH.